United States Patent [19]

Jandrich

[11] Patent Number: 4,517,884

[45] Date of Patent: May 21, 1985

[54] WINE FERMENTATION APPARATUS

[76] Inventor: Henry C. Jandrich, 369 Duke St., St. Paul, Minn. 55102

[21] Appl. No.: 481,401

[22] Filed: Apr. 1, 1983

[51] Int. Cl.³ .............................................. C12G 1/00
[52] U.S. Cl. ....................................... 99/276; 426/15; 435/296
[58] Field of Search ...................... 435/296, 313, 314; 426/15; 99/276

[56] References Cited

U.S. PATENT DOCUMENTS

| | | | |
|---|---|---|---|
| 1,579,996 | 4/1926 | Banes | |
| 1,876,860 | 9/1932 | Cooney | |
| 2,139,961 | 12/1938 | Kleid | 210/57 |
| 2,665,237 | 1/1954 | Strawinski | 195/103.5 |
| 3,005,455 | 10/1961 | Poitras et al. | 128/272 |
| 3,476,520 | 11/1969 | Hovey | 23/282 |
| 3,713,839 | 1/1973 | Delente et al. | 99/276 |
| 3,845,787 | 11/1974 | Slagle | 137/571 |

Primary Examiner—Sam Rosen
Attorney, Agent, or Firm—Anthony G. Eggink

[57] ABSTRACT

The wine fermentation apparatus is for use with a fermentation vessel to control the fermentation process therein. The apparatus permits the egress of the upper floating layer and carbon dioxide gas from the fermentation vessel, provides for the ingress of a makeup fluid to minimize oxidation of the wine produced, and prevents the entrance of bacteria and air into the fermentation vessel, to avoid a detrimental effect on the anaerobic wine fermentation process proceeding therein. The apparatus is comprised of a stopper for sealingly engaging the upper neck portion of a fermentation vessel. The stopper has a pair of upwardly extending apertures therethrough for sealably receiving an egress conduit and an ingress conduit. At their lower ends, the ingress and egress conduits are in communication with the fermentation vessel. An accumulator container disposed spacially upward of the stopper, is in communication with the upper ends of the egress and ingress conduits. The accumulator container is for holding a makeup fluid, it receives the carbon dioxide gas and upper floating layer from the fermentation vessel through the egress conduit, and it permits the transfer of makeup fluids to the fermentation vessel through the ingress conduit. The egress and ingress conduits extend upwardly to a position below the level of makeup fluid in the accumulator container to prevent the introduction of air and bacteria into the fermentation vessel where the anaerobic wine fermentation process is proceeding.

18 Claims, 5 Drawing Figures

WINE FERMENTATION APPARATUS

This invention relates to an apparatus for use with a fermentation vessel. Particularly, this invention relates to an apparatus to aid and control the anaerobic fermentation process vessel in the fermentation of wine.

The wine fermentation apparatus according to the invention is useful for a fermentation vessel during the secondary or anaerobic fermentation process in the fermentation of wine. The apparatus permits the release or transfer of carbon dioxide gas and the upper floating layer created during fermentation. The apparatus permits this release during the fermentation process while simultaneously permitting the ingress of makeup fluid to minimize oxidation of wine being produced therein. The apparatus permits the transfer of these materials while minimizing the entrance of oxygen or bacteria into the fermentation vessel.

In the past, several types of fermentation lock devices have been proposed or utilized for use with wine fermentation processes. However, these devices have been limited in function, in that they only permit the escape of carbon dioxide gas from the fermentation process. And, should it be desired by a winemaker to remove the upper floating crust materials from the fermentation vessel, or to add a makeup fluid thereto, the fermentation lock has to be removed from the vessel. This removal produces the danger of introducing air and bacteria to the fermentation process, and this is deterimental to the fermentation process itself.

Additionally, the fermentation lock devices that have been proposed or utilized for wine fermentation processes have often involved or required difficult to manufacture, and, therefore, expensive, glass blowing parts. For example, one type of fermentation lock involves the use of a convoluted glass conduit extending from the center of a cork, and which has a pair of spacially removed reservoir bubbles for holding a liquid to provide the lock. Another type of fermentation lock teaches the use of an upwardly extending glass conduit from a cork which extends into an openable reservoir wherein which an inverted cup rests on the glass conduit end. These fermentation lock devices serve primarily as low pressure valves for fermentation vessels to permit the escape of carbon dioxide gas.

The wine fermentation apparatus of this invention overcomes the limitations and shortcomings of these prior art devices. Particularly, the apparatus of this invention provides a simple, easy to manufacture, inexpensive, and effective device, which not only provides a low pressure valve for a wine fermentation vessel to permit the escape of carbon dioxide gas, but which also permits the egress of the upper floating crust; and, which, permits the ingress of a makeup fluid back to the fermentation vessel so that the contents therein remain topped up in order to minimize possible oxidation of the wine, which is detrimental to the anaerobic process. Thus, the apparatus of this invention provides a winemaker with the ability to control a fermentation process without the danger of introduction of air or bacteria to the fermentation vessel, which is severely detrimental to the quality of the wine being produced. And, in so far as is known, the degree of control provided by this apparatus has not been provided in the past.

In summary, this invention provides a wine fermentation apparatus for use with a fermentation vessel to control a wine fermentation process therein. The apparatus is comprised of a stopper to sealingly engage an upper neck portion of the otherwise closed fermentation vessel. The stopper has a pair of upwardly extending apertures therethrough. A pair of conduits extend through these apertures, one for the egress of carbon dioxide gas and the upper floating crust materials from the fermentation vesel, and the other for the ingress of makeup fluids into the fermentation vessel.

An accumulation container, having an opened top, is in communication with the upper ends of the ingress and egress conduits. The accumulation container is for receiving a quantity of makeup fluid having a level above the upper ends of the respective conduits so as to provide a seal. Thus, with the stopper of the apparatus in sealing engagement with the upper neck portion of the fermentation vessel, and with a makeup fluid introduced into the accumulator container, the carbon dioxide gas and upper floating crust materials produced during the fermentation process escape through the egress conduit into the accumulator container. And, makeup fluid, with suspended materials therein, is returned to the fermentation vessel through the ingress conduit. This continual process takes place without the introduction of air or bacteria into the fermentation vessel. And, the wine maker, has access to the open end of the accumulator container to remove undesired materials therefrom and to introduce new quantities of makeup fluid.

Additionally provided by the invention is a fermentation apparatus having a concave bottom portioned stopper with an egress conduit in a flush position therewith, which provides a funneling means for the upper floating crust materials produced during wine fermentation. And, provided are stopper/accumulator container arrangements which are suitable for certain types of manufacture, which provide increased conduit seal effects, and which generally simplify the cooperation of elements of the apparatus.

These and other benefits of this invention will become clear from the following description, by reference to the drawings, wherein.

Figure 1:
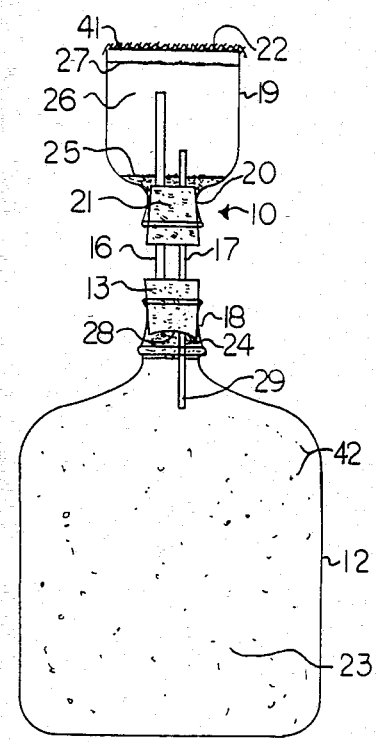
FIG. 1 is a schematic lateral plan view of the wine fermentation apparatus of the invention, and, which shows the apparatus in use in conjunction with a wine fermentation vessel having an upwardly extending neck portion.

Referring to FIG. 1, a wine fermentation apparatus 10 is illustrated in use with a wine fermentation vessel 12, having an upper neck portion 18. The fermentation vessel 12 has a volumetric quantity of wine 23 therein, which is undergoing a fermentation process, and which, as a result produces carbon dioxide gas bubbles 42 and an upper floating crust layer 24.

Generally, the production of wine includes the production of ethanol by alcoholic fermentation, in which grape or other fruit juices having sugars, such as fructose or glucose, are transformed into ethanol and other higher alcohols and esters, by yeast fermentation. The yeast is either a pure culture of a selected strain of yeast, or is a natural one brought about by the "bloom" which exists on the surface of the grapes themselves. However, fermentation is a form of respiration which involves the conversion of sugars into ethyl alcohol by the enzymes of yeast.

The art of wine making is quite varied, in that it can involve many types of base materials. Although the use of grapes is best known, other ingedients, such as cultivated fruits, i.e., apples, pears, peaches, plums, etc., wild fruits, dried fruits, fruit concentrates, flowers, and herbs can also be utilized. All of these can be used in wine making, but each requires a specific use of other ingredients in combination, and the wine making process itself may vary, as a consequence.

For example, the use of grapes involves the crushing of the grapes, adjusting the sugar content, adding a yeast nutrient, and then proceeding to both a primary fermentation and then a secondary fermentation process. When other ingredients are used, however, it may be possible to eliminate the primary fermentation process. The wine fermentation apparatus of this invention is for use with what is commonly termed as the secondary fermentation process. This process being characterized generally by the less vigorous fermentation process, wherein the fermentation lock devices have been utilized in the past.

During primary fermentation, a mass of juice, skins and seeds, or "must", for example, after being innoculated with a culture of wine yeast, produces a rapid conversion of sugars to ethanol and is accompanied by the rapid generation of carbon dioxide gas. These rising gas bubbles also cause particles of solid matter, such as skin and pulp, to come upward and float on the surface, to form what is commonly referred to as the "cap". This cap or upper floating layer must be broken up from time to time in order for the fermentation process to proceed in a proper manner. If allowed to dry, for example, the cap, hat or foam can cause the heat produced during fermentation to be trapped and to cause the must to overheat. Additionally, it can form a breeding ground for spoilage bacteria.

Generally, the secondary fermentation stage is a slower process, and it is usually performed in a vessel having a narrow neck on which a fermentation lock can be placed. Although, sugars are still being converted, and carbon dioxide is still produced, the coarser suspended solids fall out of solution, and the general rate of fermentation is much slower. This process is preferably done in an oxygen free environment so that certain ingredients are not oxidated to impair the color, flavor, body or alcoholic content of the wine. Thus, a fermentation lock has, in the past, been instrumental in the production of quality home made wines. However, the apparatus of this invention offers much more control over this secondary or anaerobic fermentation process, and, therefore, permits the production of quality wines, with less effort and greater predictability.

Figure 2:
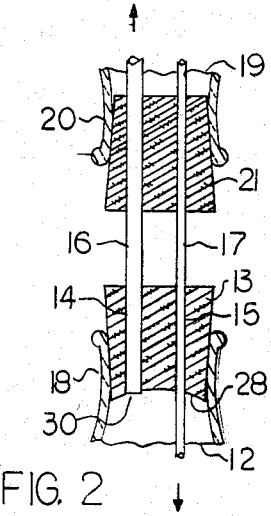
FIG. 2 is a cut-away, schematic, cross sectional view of the ingress and egress conduits in communication between the fermentation vessel and accumulator container, as shown in FIG. 1.

The wine fermentation apparatus 10, as shown in FIG. 1, is for sealingly engaging the neck portion 18 of a preferably glass or plastic vessel, generally having a volume of one, five or ten gallons. The fermentation apparatus is comprised of stopper or ingress and egress means 13, which has a pair of upwardly extending apertures 14 and 15, which extend through the body of stopper or cork 13. An egress conduit 16 and an ingress conduit 17, preferably glass tubes, extend sealingly through apertures 14 and 15 for communication with fermentation vessel 12. An inverted, upwardly extending container 19 having an opened top 22 is spacially disposed upward from stopper 13. The conduits 16 and 17 are, at their respective upper ends, in communication with the accumulator container 19 through stopper 21, which is sealingly inserted in the neck portion 20 of container 19. The stopper 21, as shown in FIG. 1, has apertures extending therethrough for sealingly receiving conduits 16 and 17. FIG. 2, particularly, illustrates the communication between vessel 12 and container 19, in that it shows an enlarged view of the conduits 16 and 17, and their respective extension through stoppers 13 and 21.

As the fermentation process proceeds in the vessel 12, carbon dioxide bubbles 42 rise upward, as do solid materials to form an upper foaming cap or crust 24. As shown in FIG. 2, the bottom portion 28 of stopper or cork 13 is cupped or concave in configuration to provide a funneling means for the upper floating layer 24. And, the bottom end 30 of the egress conduit is preferably flush with bottom portion 28 to accomodate the upwardly rising foam or cap materials 24. These materials 24, along with the carbon dioxide gas 42 rise through egress conduit 16, and into the accumulator container 19.

The container 19, during wine fermentation, is filled with a makeup fluid, such as distilled water or wine fluids, and the level of that fluid is above the upper ends of conduits 16 and 17 so that a seal is created. And, preferably, a cover 41 is placed over the top of open end 22 of container 19 to prevent the entrance of airborn bacteria. The cover 41 can be a loose fitting plastic sheet, cloth, glass cover, or the like.

Thus, as the materials, as described above, exit upward from the vessel 12 through egress conduit 16, some materials 25 settle onto the bottom of container 19, and some floating materials 27 float atop the makeup fluid 26. The makeup fluid 26, which obviously contains some of the fermented wine is returned through ingress conduit 17 into fermentation vessel 12 to keep the liquid level therein at a maximum height to minimize the oxidation of the fermenting wine 23. And, the wine maker, is provided access to the accumulator container 19 so that undesired materials can be removed therefrom and makeup fluids added.

Figure 3:
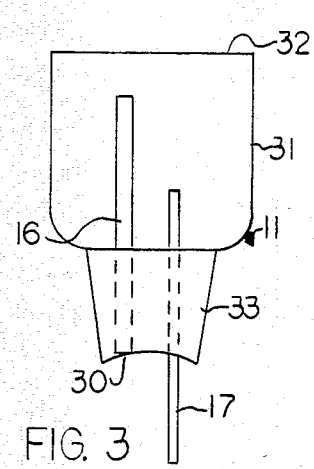
FIG. 3 is a schematic, lateral plan view of another embodiment of a wine fermentation apparatus according to the teachings of the invention.

FIG. 3 illustrates another embodiment 11 of the wine fermentation apparatus. It is shown as having an accumulator container 31 which is secured or attached to stopper 33. The container 31 has an open top 32. This embodiment obviously eliminates many of the elements of the apparatus shown as 10, in FIG. 1. This embodiment 11 can, for example, consist of a plastic, molded container 31 which is permanently adhered to a cork or rubber stopper 33 or it can be a unitary, molded structure. The stopper 33, also is shown as having a concave bottom portion for funneling purposes. And, this configuration also reduces the lengths of conduits 16 and 17, which are required for its operation, as compared to the apparatus, as shown in FIG. 1.

Figure 4:
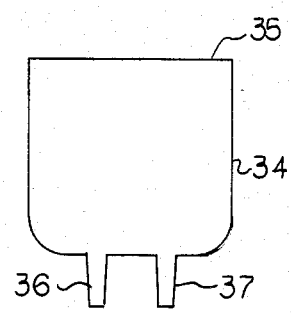
FIG. 4 is a schematic, lateral plan view of one embodiment of an acumulator container of the wine fermentation apparatus of the invention; and, FIG. 5 is a cut-away, expanded, cross sectional lateral view of one depending conduit sealing member of the accumulator container shown in FIG. 4.
Figure 5:
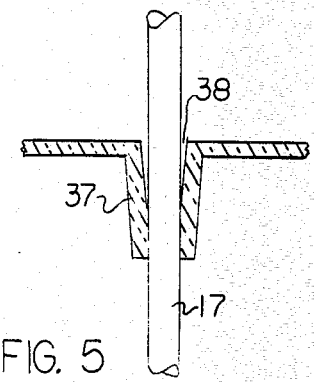

FIG. 4 illustrates another embodiment of the accumulator container. It has a generally circular cross sectioned enclosure 34 with open top 35, and depending tubular extensions 36 and 37 at its bottom end. These extensions, as 17 is shown enlarged in FIG. 5, have decreasing or funnelled interior diameters 38, so that an improved seal is formed with the conduit extending therethrough. This embodiment, as that of FIG. 1, permits the glass conduits to be visable to the eye, so that the wine maker is able to watch the ingress and egress of materials proceeding therethrough, in order to moniter the stage of fermentation in vessel 12. And, this embodiment eliminates the need of a stopper 21.

In summary, the wine fermentation apparatus according to the teachings of this invention, permits the egress of carbon dioxide gas and foam or upper crust materials from the fermentating wine, while permitting the ingress of a makeup fluid; and, all to the exclusion of air and bacteria, which are detrimental to the fermentation process. As shown in FIG. 1, the ingress conduit 17 has a bottom portion extension 29 which is lower than the corresponding lower end of egress conduit 16. And, the egress conduit 16 is also preferably larger in diameter than that of ingress conduit 17.

With respect to the upper ends of the conduits 16 and 17, the upper end of egress conduit 16, which is larger in diameter to facilitate the funneled movement of upper floating materials 24, is also higher in elevation to permit materials 24 to rise in the egress tube and fall in the makeup fluid 26, so as not to impair flow through the upper extension of ingress conduit 17. However, the upper end of ingress conduit 17 is, preferably, above the top of stopper 21, so that the sediment 25 is not returned to the fermentation vessel 12.

As many changes are possible to the embodiments of this invention, utilizing the teachings thereof, the descriptions above, and the accompanying drawings, should be interpreted in the illustrative, and not in the limited sense.

That which is claimed is:

1. A wine fermentation apparatus for use with a fermentation container having a narrow and open top, said apparatus for controlling and aiding a wine fermentation process therein, said apparatus comprising:
   (a) a stopper for sealingly engaging the narrowed top of the fermentation container, said stopper having two vertically extending apertures therethrough, said stopper further having a concave, upwardly extending bottom portion for funnelling the upper floating layer produced in the fermentation process,
   (b) a pair of conduits of predetermined lengths for the ingress and egress of materials to and from the fermentation container, said conduits for the sealing extension through said apertures of said stopper, the bottom of said egress conduit being flush with said concave bottom portion of said stopper and the bottom of said ingress conduit extending downward from said stopper concave bottom portion, and,
   (c) an upwardly extending opened container being in sealing communication with said pair of conduits, said upwardly extending container for receiving materials from the fermentation container through said egress conduit and for holding and returning a makeup fluid to the fermentation container through said ingress conduit, said ingress and egress conduits further having their respective top portions terminate intermediate the top and bottom of said upwardly extending container with said egress conduit terminating at a point higher than that of said ingress conduit, whereby, subsequent to sealingly engaging said apparatus to the top of a fermentation container having a wine fermentation process taking place therein, said apparatus with a makeup fluid therein permits the transfer of the upper floating layer to be funnelled to said concave bottom portion of said stopper through the egress conduit, and the transfer of makeup fluid through the ingress conduit, without disturbing the anaerobic fermentation process in the fermentation container.

2. The wine fermentation apparatus of claim 1, wherein said pair of conduits are longitudinally extending glass tubes having a circular cross section.

3. The wine fermentation apparatus of claim 1, wherein said stopper and said upwardly extending opened container are contiguous in structure.

4. The wine fermentation apparatus of claim 1, wherein said stopper is constructed of a cork material.

5. The wine fermentation apparatus of claim 1, wherein said upwardly extending container is injection molded of a thermoplastic resin.

6. The wine fermentation apparatus of claim 1, wherein said apparatus is designed for use with a fermentation container having an upwardly extending neck portion, and, wherein, the fermentation container has a volume having a range from one to ten gallons for home wine making purposes.

7. The wine fermentation apparatus of claim 1, wherein said upwardly extending opened container is an inverted, right cylindrical container having a lowered neck portion, and wherein an apertured cork is provided for sealing insertion into said neck portion, said ingress and egress conduits extending through said apertured cork.

8. A wine fermentation apparatus for use with a fermentation container, said apparatus for controlling and aiding a wine fermentation process therein, said apparatus comprising:
   (a) a fermentation container having a narrow and open top portion,
   (b) a stopper for sealingly engaging the narrowed top of the fermentation container, said stopper having two vertically extending apertures therethrough, said stopper further having a concave, upwardly extending bottom portion for funnelling the upper floating layer produced in the fermentation process,
   (c) a pair of conduits of predetermined lengths for the ingress and egress of materials to and from the fermentation container, said conduits for the sealing extension through said apertures of said stopper, the bottom of said egress conduit being flush with said concave bottom portion of said stopper and the bottom of said ingress conduit extending downward from said stopper concave bottom portion, and
   (d) an upwardly extending opened container being in sealing communication with said pair of conduits, said upwardly extending container for receiving materials from the fermentation container through said egress conduit and for holding and returning a makeup fluid to the fermentation container through said ingress conduit, said ingress and egress conduits further having their respective top portions terminate intermediate the top and bottom of said upwardly extending container with said egress conduit terminating at a point higher than that of said ingress conduit, whereby, subsequent to sealingly engaging said apparatus to the top of a fermentation container having a wine fermentation process taking place therein, said apparatus with a makeup fluid therein permits the transfer of the upper floating layer to be funnelled to said concave bottom portion of said stopper through the egress conduit, and the transfer of makeup fluid through the ingress conduit, without disturbing the anaerobic fermentation process in the fermentation container.

9. The wine fermentation apparatus of claim 8, wherein said pair of conduits are longitudinally extending glass tubes having a circular cross section.

10. The wine fermentation apparatus of claim 8, wherein said stopper and said upwardly extending opened container are contiguous in structure.

11. The wine fermentation apparatus of claim 8, wherein said stopper is constructed of a cork material.

12. The wine fermentation apparatus of claim 8, wherein said upwardly extending opened container has a pair of tubular extensions depending therefrom for sealingly receiving said ingress and egress conduits.

13. The wine fermentation apparatus of claim 12, wherein said tubular extensions have decreasingly narrowing interior diameter wall structures so that said ingress and egress conduits are increasingly gripped thereby to ensure sealibility.

14. The wine fermentation apparatus of claim 13, wherein said upwardly extending container is injection molded of a thermoplastic resin.

15. The wine fermentation apparatus of claim 8, wherein said apparatus is designed for use with a fermentation container having an upwardly extending neck portion, and, wherein, the fermentation container has a volume having a range from one to ten gallons for home wine making purposes.

16. The wine fermentation apparatus of claim 8, wherein said upwardly extending opened container is an inverted, right cylindrical container having a lowered neck portion, and wherein an apertured cork is provided for sealing insertion into said neck portion, said ingress and egress conduits extending through said apertured cork.

17. A wine fermentation apparatus for use with a fermentation container having a narrow and open top portion, said apparatus for controlling and aiding a wine fermentation process therein, said apparatus comprising:

(a) a stopper for sealingly engaging the narrowed top of the fermentation container, said stopper having two vertically extending apertures therethrough, said stopper further having a concave, upwardly extending bottom portion for funnelling the upper floating layer produced in the fermentation process, (b) a pair of conduits of predetermined lengths for the ingress and egress of materials to and from the fermentation container, said conduits for the sealing extension through said apertures of said stopper, the bottom of said egress conduit being flush with said concave bottom portion of said stopper and the bottom of said ingress conduit extending downward from said stopper concave bottom portion, and (c) an upwardly extending opened container being in sealing communication with said pair of conduits, said upwardly extending container for receiving materials from the fermentation container through said egress conduit and for holding and returning a makeup fluid to the fermentation container through said ingress conduit, said ingress and egress conduits further having their respective top portions terminate intermediate the top and bottom of said upwardly extending container with said egress conduit terminating at a point higher than that of said ingress conduit, said upwardly extending opened container further having a pair of tubular extensions depending therefrom for sealingly receiving said ingress and egress conduits, whereby, subsequent to sealingly engaging said apparatus to the top of a fermentation container having a wine fermentation process taking place therein, said apparatus with a makeup fluid therein permits the transfer of the upper floating layer to be funnelled to said concave bottom portion of said stopper through the egress conduit, and the transfer of makeup fluid through the ingress conduit, without disturbing the anaerobic fermentation process in the fermentation container.

18. The wine fermentation apparatus of claim 17, wherein said tubular extensions have decreasingly narrowing interior diameter wall structures so that said ingress and egress conduits are increasingly gripped thereby to ensure sealibility.

* * * * *